Feb. 28, 1933.   H. VOGLER   1,899,124
BORING AND TURNING MACHINE
Filed Dec. 3, 1931
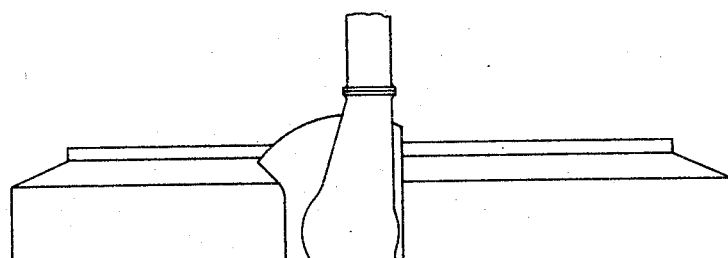
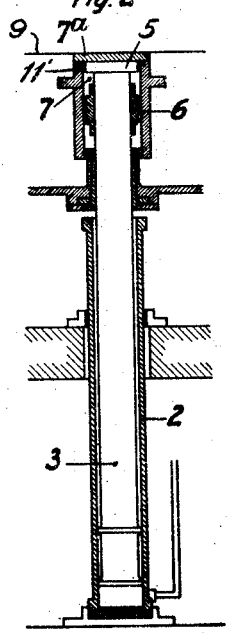
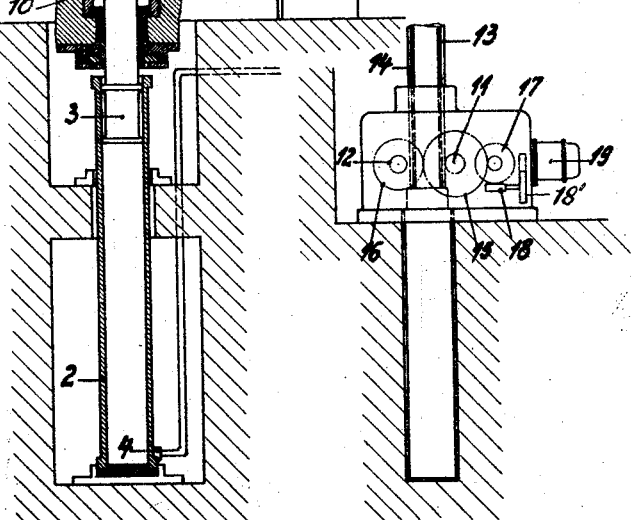
Inventor
H. Vogler:
by
Attorney.

Patented Feb. 28, 1933

1,899,124

UNITED STATES PATENT OFFICE

HERMANN VOGLER, OF DUSSELDORF, GERMANY, ASSIGNOR TO SCHIESS-DEFRIES AKTIENGESELLSCHAFT, OF DUSSELDORF, GERMANY

BORING AND TURNING MACHINE

Application filed December 3, 1931, Serial No. 578,727, and in Germany September 27, 1930.

This invention relates to a vertical boring and turning machine in which the work rotates, and in which the boring head slides upon a non-rotatable boring rod.

According to the invention the boring rod can be lowered into a cavity within the tubular spindle of the rotating table. The vertical movement of the boring rod may be effected by hydraulic, pneumatic or mechanical—that is electro-magnetic—means. The apparatus according to the invention is distinguished by its simplicity in comparison with known apparatus, of the kind in which the boring rod, as part of the vertical boring machine, is movable in the machine.

A further advantage of the machine according to the invention is that the boring rod may be fixed to a support of conventional design, whereas in the known constructions the boring rod supports must be specially constructed.

Two constructions of apparatus according to the invention are diagrammatically illustrated by way of example in the accompanying drawing.

Figure 1 shows one construction of the complete apparatus.

Figure 2 shows one part of the machine in an inoperative position, and

Figure 3 shows a modified construction of the apparatus.

In the drawing, 1 is the vertically movable boring rod, and 2 is the pressure cylinder for air or water under compression; the inner or lower part of the boring rod, which is in the form of pressure piston 3 reciprocates vertically in the pressure cylinder. In the position of rest the pressure piston 3 is in the lowermost position immediately above the opening 4 for the admission of the air or water under pressure.

The upper end portion of the boring rod is provided with a coupling flange 5 for detachable engagement when the rod is in operative position with an overhead support 8, which may be an advancing or guiding and traversing member. On the rod is a sliding sleeve 6 to which is detachably secured a boring head or tool 6a, which sleeve and head when disposed in the operative position shown in Fig. 1 are disposed on the rod below and in spaced relation to the flange 5 and at a level approximately midway between the support 8 and a rotary work table 9, mounted for rotation with a hollow spindle 7. The rod 1 when projected upward by the pressure piston 3 extends through the spindle 7 and through an opening 10 in the work table into which the spindle is fitted. The rod is adapted, upon detaching its flange 5 from the support 8 and the head 6a from the sleeve 6, to be moved downward to an inoperative position in which its upper end is received within the spindle 7 and lies below the top of the work table, in which operation the sleeve 6 is also adjusted to an inoperative position upward on the rod adjacent to the flange 5, so as to adapt the sleeve 6 to also be received within the spindle 7 when the rod is lowered. In order to enable this to be done the sleeve 7 is annularly enlarged to an internal diameter greater than the diameter of the rod 1 so as to form a housing 7' in which the flange 5 and sleeve 6 may be accommodated below the surface of the table, as shown in Fig. 2. The upper end of the spindle terminates below the top of the table, leaving a recess or receiving space 11' at the top of the opening 10 to receive a cover plate 7a, whereby the said recess and the top of the spindle may be closed when the rod is lowered. When thus applied the plate lies flush with the top of the table, providing a continuous or unbroken table surface whereby the apparatus may be used as an ordinary vertical boring machine or for other purposes.

Figure 3 illustrates a form of the machine in which the boring rod is moved by electromechanical means. The toothed wheels 11 and 12, which are disposed one at each side of the boring rod, engage in the respective toothed racks 13 and 14 fitting in the boring rod, and they are driven by the electric motor 19 through gear wheels 15 and 16 and worm wheel 17 and worm 18.

I claim:

A vertical boring and turning machine, comprising an overhead support, a rotatable work table arranged below said support and having a central opening therein, a hollow spindle for said work table fitting in said opening and terminating at its upper end therein below the surface of the table, a non-rotatable boring rod axially movable through said opening and hollow spindle and having an upper end portion provided with coupling means for detachable engagement with said overhead support, a sleeve slidably mounted upon said boring rod for adjustment thereon to an operative position below and in spaced relation to the upper end portion of the rod and to an inoperative position close to said end portion of the rod, a boring head removably secured to the sleeve, means for moving said boring rod from a normal operative position in which its upper end lies above the level of the work table and is coupled to the support to an inoperative position in which its upper end is detached from the support and the rod and its upper end lies within the hollow spindle below the level of the work table, the said spindle being annularly enlarged to form a housing of a greater internal diameter than the diameter of the rod to receive such end of the rod and the sleeve when the latter is disposed in inoperative position and the uncoupled rod is lowered, and a cover to fit within the opening above the spindle and flush with the surfaces of the table when the boring rod is in lowered position.

HERMANN VOGLER.